US011214287B2

(12) United States Patent
Lin et al.

(10) Patent No.: US 11,214,287 B2
(45) Date of Patent: Jan. 4, 2022

(54) WARNING SYSTEM FOR DETECTING APPROACHING OBJECT AND METHOD THEREOF

(71) Applicant: CUBTEK INC., Zhubei (TW)

(72) Inventors: Jyong Lin, Zhubei (TW); Yu-Jen Lin, Zhubei (TW); Guo-Hao Syu, Zhubei (TW); Chia-Chun Chu, Zhubei (TW)

(73) Assignee: CUBTEK INC., Zhubei (TW)

( * ) Notice: Subject to any disclaimer, the term of this patent is extended or adjusted under 35 U.S.C. 154(b) by 0 days.

(21) Appl. No.: 17/061,349

(22) Filed: Oct. 1, 2020

(65) Prior Publication Data

US 2021/0016810 A1 Jan. 21, 2021

Related U.S. Application Data

(63) Continuation-in-part of application No. 16/287,205, filed on Feb. 27, 2019, now Pat. No. 10,843,626.

(51) Int. Cl.
*B61L 23/04* (2006.01)
*G01S 13/931* (2020.01)
*B61L 23/34* (2006.01)

(52) U.S. Cl.
CPC ............ *B61L 23/041* (2013.01); *B61L 23/34* (2013.01); *G01S 13/931* (2013.01); *G01S 2013/9328* (2013.01)

(58) Field of Classification Search
CPC .............. B60Q 9/008; B60W 50/0097; B60W 2520/06; B60W 2550/10
USPC .................................................. 340/435–436
See application file for complete search history.

(56) References Cited

U.S. PATENT DOCUMENTS

| 4,825,211 A * | 4/1989 | Park | G01S 17/931 340/901 |
|---|---|---|---|
| 5,265,556 A * | 11/1993 | Hall | E01F 9/662 116/142 FP |
| 5,661,474 A * | 8/1997 | Douglas | G08G 1/02 200/86 A |
| 5,760,686 A * | 6/1998 | Toman | G08B 5/006 340/331 |
| 5,959,552 A * | 9/1999 | Cho | B60R 19/38 340/903 |
| 6,288,651 B1 * | 9/2001 | Souza | E01F 9/688 200/86 A |
| 6,512,451 B1 * | 1/2003 | Eslambolchi | E01F 9/688 340/425.5 |

(Continued)

*Primary Examiner* — Eric Blount
(74) *Attorney, Agent, or Firm* — Muncy, Geissler, Olds & Lowe, P.C.

(57) ABSTRACT

A warning system for detecting approaching object and method thereof are provided. A detection unit detects a moving path of the approaching object; a storage unit stores a warning information including the warning area and the confirmation condition; and a processing unit receives the detection signal provided by the detection unit to acquire the current moving path of the approaching object. When the approaching object is detected as moving in the buffering zone, the confirmation operation of the confirmation condition is activated. When the moving path falls in the warning area and fulfills the confirmation condition, the processing unit sends out a warning signal. Therefore, a potentially dangerous approaching object is accurately identified, and the warning is correctly sent.

32 Claims, 14 Drawing Sheets

(56) References Cited

U.S. PATENT DOCUMENTS

| | | | | |
|---|---|---|---|---|
| 7,230,546 | B1* | 6/2007 | Nelson | G08G 1/01 |
| | | | | 340/907 |
| 7,538,688 | B1* | 5/2009 | Stewart | E01F 13/028 |
| | | | | 116/63 C |
| 8,237,555 | B2* | 8/2012 | McCarthy | G08G 1/01 |
| | | | | 340/435 |
| 9,365,155 | B2* | 6/2016 | Hathaway | B60Q 5/006 |
| 9,466,216 | B2* | 10/2016 | Frederick | F16P 3/145 |
| 9,489,841 | B1* | 11/2016 | Huggins | G08G 1/04 |
| 9,792,820 | B1* | 10/2017 | Russell, Jr. | G08G 1/0955 |
| 9,940,839 | B2* | 4/2018 | Stafford | E01F 9/70 |
| 10,319,227 | B2* | 6/2019 | Roy | G08G 1/0955 |
| 2005/0122218 | A1* | 6/2005 | Goggin | G01S 17/931 |
| | | | | 340/552 |
| 2012/0126996 | A1* | 5/2012 | McCarthy | G08G 1/166 |
| | | | | 340/902 |
| 2015/0054660 | A1* | 2/2015 | Simmons | B60Q 7/00 |
| | | | | 340/908 |

* cited by examiner

WARNING SYSTEM FOR DETECTING APPROACHING OBJECT AND METHOD THEREOF

CROSS REFERENCE TO RELATED APPLICATIONS

This application is a Continuation-in-Part of co-pending application Ser. No. 16/287,205, filed on 27 Feb. 2019, for which priority is claimed under 35 U.S.C. § 120, the entire contents of all of which are hereby incorporated by reference.

BACKGROUND OF THE INVENTION

1. Field of the Invention

The present invention relates to warning systems, and more particularly, to a warning system for detecting approaching object and method thereof.

2. Description of the Related Art

A conventional detection warning system is statically placed for preventing the collision caused by other approaching objects. The radar detects the speed or distance of an approaching object, thereby determining if the approaching object is a potentially dangerous vehicle. However, when the approaching speed or distance of the approaching object reaches a predetermined range, the alarm will be sounded even if the approaching object moves away toward other directions or the moving path of the approaching object is deemed to be non-threatening. As a result, the people at the scene will misjudge the approaching object as a dangerous vehicle for the driving, further causing fear or panic.

Another conventional image detection system (such as thermal detector) is operated when a train passes a control area at the intersection of a rail and a road. Such system automatically detects any lingering vehicles or people through by use of images, and accordingly send out warning for expelling the lingering vehicles and people, achieving the function of auto-detecting obstacles. However, regarding such conventional image detection system, besides the possibility of misidentification under a poor vision, if there are no vehicles or people lingering in the control area but there are approaching objects, people or animals heading toward the control area, the conventional image detection system is unable to detect and send out the warning for immediately stopping the train from entering the control area.

SUMMARY OF THE INVENTION

For improving the issues above, a warning system for detecting approaching object and the method thereof are disclosed. By detecting the moving path of the approaching object, when the moving path is identified to fall in the warning area, with other conditions being fulfilled, the processing unit outputs the warning signal for providing the warning.

For achieving the aforementioned objectives, a warning system for detecting approaching object in accordance with the present invention is provided, wherein the approaching object is allowed to be a vehicle, the warning system comprising:

a detection unit detecting a moving path of the approaching object, and transforming the moving path into a detection signal which is then outputted;

a storage unit storing a warning information, the warning information including a warning area set in the detection area, and a confirmation condition for confirming that the approaching object continuously moves in the warning area, wherein the warning area includes a warning area and a buffering area, the warning area being formed of an expansion of a predetermined width which is detectable by the detection unit, and the buffering area expanding out of the warning area; and a processing unit electrically connected with the detection unit and the storage unit, the processing unit receiving the detection signal to acquire the current moving path;

when the approaching object is detected as moving into the buffering area, a calculation of the confirmation condition is activated, and when the moving path falls in the warning area and fulfills the confirmation condition, the processing unit sends a warning signal.

Also, a warning method for detecting an approaching object in accordance with the present invention is provided, comprising following steps:

detecting a moving path of the approaching object in a detection area with a detection unit, transforming the moving path into a detection signal, and outputting the detection signal;

storing a warning information with a storage unit, the warning information including a warning area set in the detection area, and a confirmation condition for confirming that the approaching object continuously moves in the warning area, wherein the warning area includes a warning area and a buffering area, the warning area formed of an expansion of a predetermined width which is detectable by the detection unit, and the buffering area expanding out of the warning area; and receiving the detection signal with a processing unit which is electrically connected with the detection unit and the storage unit to acquire the current moving path of the approaching object, such that when the approaching object is detected as moving into the buffering area, a calculation of the confirmation condition is activated, and when the moving path falls in the warning area and fulfills the confirmation condition, the processing unit sends a warning signal.

Therefore, the moving path of the approaching object must conform to the warning area, and the confirmation condition must be fulfilled, so that the approaching object is confirmed to be continuously moving in the warning area. Also, for the object to be determined as a potential collision threat, other requirements must be met, such that the processing unit sends out the warning signal. Therefore, the issue of misidentifying a dangerous object is resolved, thus preventing people at the scene from fearing or panicking due to an incorrect identification.

In another embodiment of the present invention, a warning system detecting approaching object is provided, which is disposed on a control area of an intersection of rails and/or roads. The system comprises a plurality of detection units, a storage unit, and a processing unit. The detection units has at least two transmission frequencies for detecting a moving path of an object which approaches the control area along the road, wherein the moving path is transformed into the detection signal which is then outputted. The storage unit stores a warning information, which comprises a warning area and a confirmation condition for confirming that the approaching object continuously moves in the warning area.

The processing unit is electrically connected with the plurality of detection units and the storage unit. The processing unit receives the detection signal for acquiring the current moving path of the approaching object. When the processing unit identifies that the moving path is in the warning area, and the confirmation condition is fulfilled, the processing unit outputs a warning signal.

Therefore, when the moving path of the approaching object is detected to be in the warning area, with the confirmation condition fulfilled, it is confirmed that the approaching object continuously moves toward the control area along the warning area, so that the processing unit outputs the warning signal, so as to notify the train moving toward the control area to stop, thereby preventing collision of the approaching object and the train in the control area, avoiding serious accidents.

DETAILED DESCRIPTION OF THE INVENTION

Figure 1:
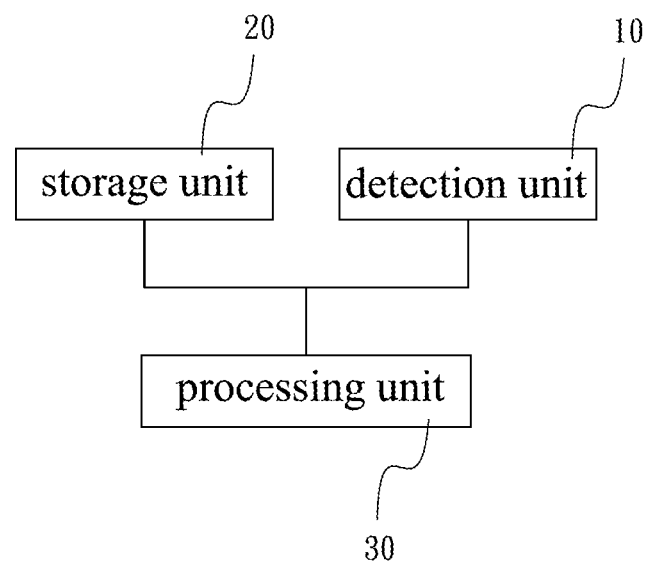
FIG. 1 is a block diagram of the warning system in accordance with the first embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 14, a warning system for detecting approaching object and method thereof are provided. The warning system 100 for detecting approaching object comprises a detection unit 10, a storage unit 20, and a processing unit 30. The warning system 100 is statically disposed on a malfunctioned vehicle (not shown) or applied as a traffic cone for detecting an approaching object V. In the embodiment, the approaching object is allowed to be a moving vehicle. In fact, any objects that are approaching can be the target to be detected, so that the warning system 100 is able to be applied for detecting falling stones or objects approaching a ship. The warning method for detecting the approaching object V will be illustrated below.

The detection unit 10 detects a moving path P of the approaching object V (the moving path of a moving vehicle in the embodiment), and the moving path P is transformed into a detection signal which is to be output. The storage unit 20 is applied for saving a warning information, wherein the warning information includes a warning area L and a confirmation condition. The warning area L is set in the detection area. The confirmation condition is applied for confirming that the approaching object V keeps moving in the warning area L. The processing unit 30 is electrically connected with the detection unit 10 and the storage unit 20 for receiving the detection signal outputted by the detection unit 10, so as to acquire the current moving path P.

In an embodiment of the present invention, the confirmation condition is a predetermined count value. When the approaching object V enters the warning area L, a current count value will starts to count. If the current count value reaches the predetermined count value, the processing unit 30 determines that the moving path P of the approaching object V fulfills the confirmation condition in the warning area L. On the contrary, if the current count value does not reach the predetermined count value, the processing unit 30 determines that the moving path P of the approaching object V does not fulfill the confirmation condition in the warning area L.

In the embodiment of the present invention, the predetermined count value is 5, and the current count value counts from 0 to 5. When the approaching object V is out of the warning area L, the current count value remains at 0. When the approaching object V enters the warning area L, the current count value starts to count. When the current count value is equal to 5, the current count values reaches the predetermined count value. The predetermined count value and the current count value are allowed to be adjusted based on different situations and not limited to the aforementioned values.

In the embodiment, the detection unit 10 is applied for detecting a relative distance with respect to the approaching object V in the detection area, so as to acquire a time to collision (TTC). Therein, the relative distance detected by the detection unit 10 is differentiated to acquire a relative speed of the approaching object V, and the relative distance is divided by the relative speed for acquiring the time to collision. In the embodiment, the warning information comprises a predetermined collision time, which is set at approximate 3.5 seconds. In the embodiment, when the moving path P of the approaching object V is in the warning area L, with the aforementioned confirmation condition fulfilled, and the time to collision is equal to or smaller than the predetermined collision time, the processing unit sends out a warning signal.

Figure 3:
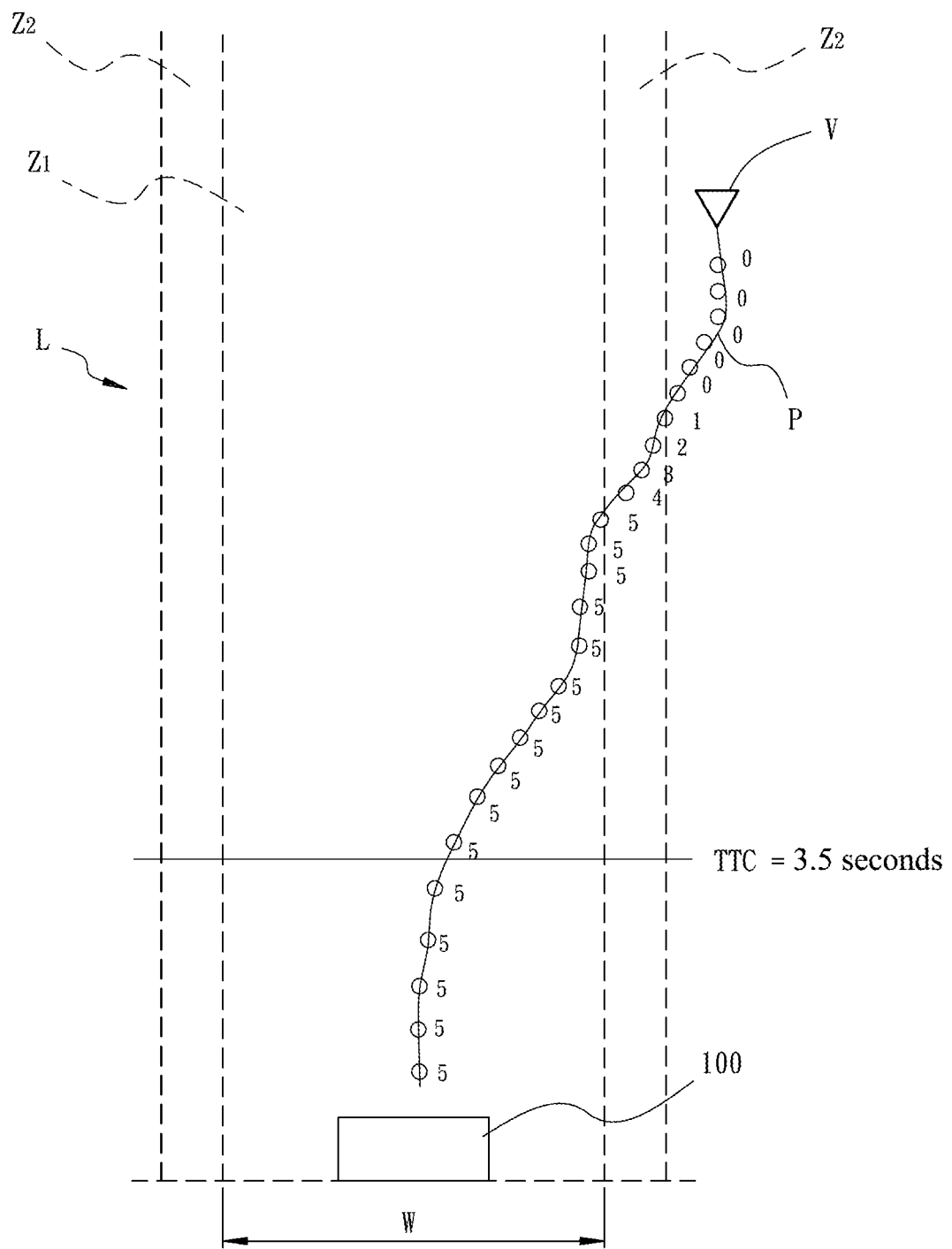
FIG. 3 is a schematic view of the warning system and method in accordance with the first embodiment of the present invention, illustrating that the approaching object is approaching and reaching a warning triggering status.
Figure 4:
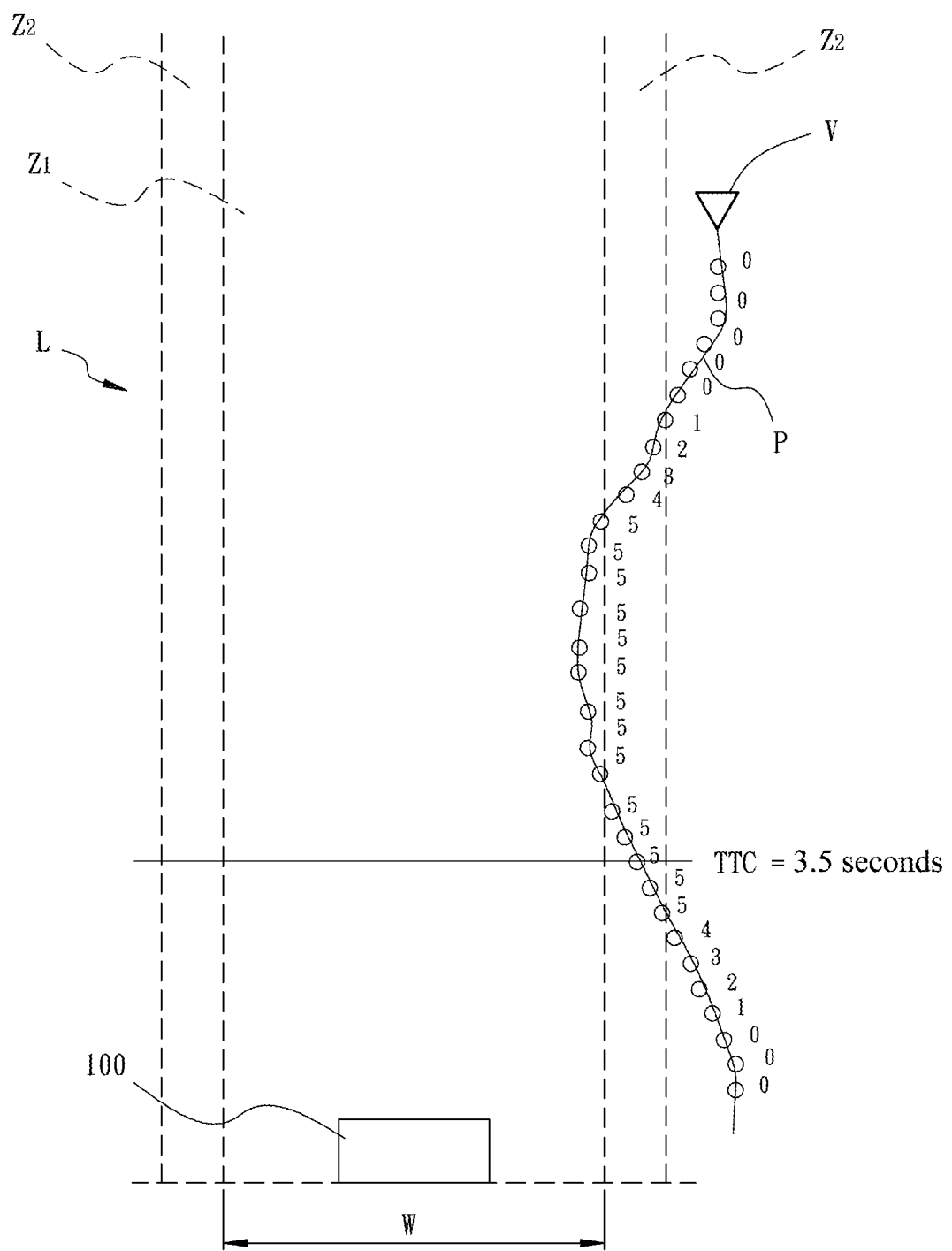
FIG. 4 is a schematic view of the warning system and method in accordance with the first embodiment of the present invention, illustrating that the approaching object is approaching but not reaching a warning triggering status.

The warning system 100 for detecting approaching object in the embodiment includes a "straight line mode" and a "curve line mode". As shown by FIG. 3 and FIG. 4, in the straight line mode, the warning area L includes a straight line warning zone Z1 and a buffering zone Z2. The buffering zone Z2 expands outward from the straight line warning zone Z1. The straight line warning zone Z1 is formed of an expansion of the predetermined width W which is detectable by the detection unit 10. In the embodiment, the straight line warning zone Z1 is formed by a straight expansion of the predetermined width W expanding toward a same direction, and the buffering zone Z2 is an expansion of the straight line warning zone Z1 which symmetrically expands toward two sides thereof by an identical distance.

Figure 2:
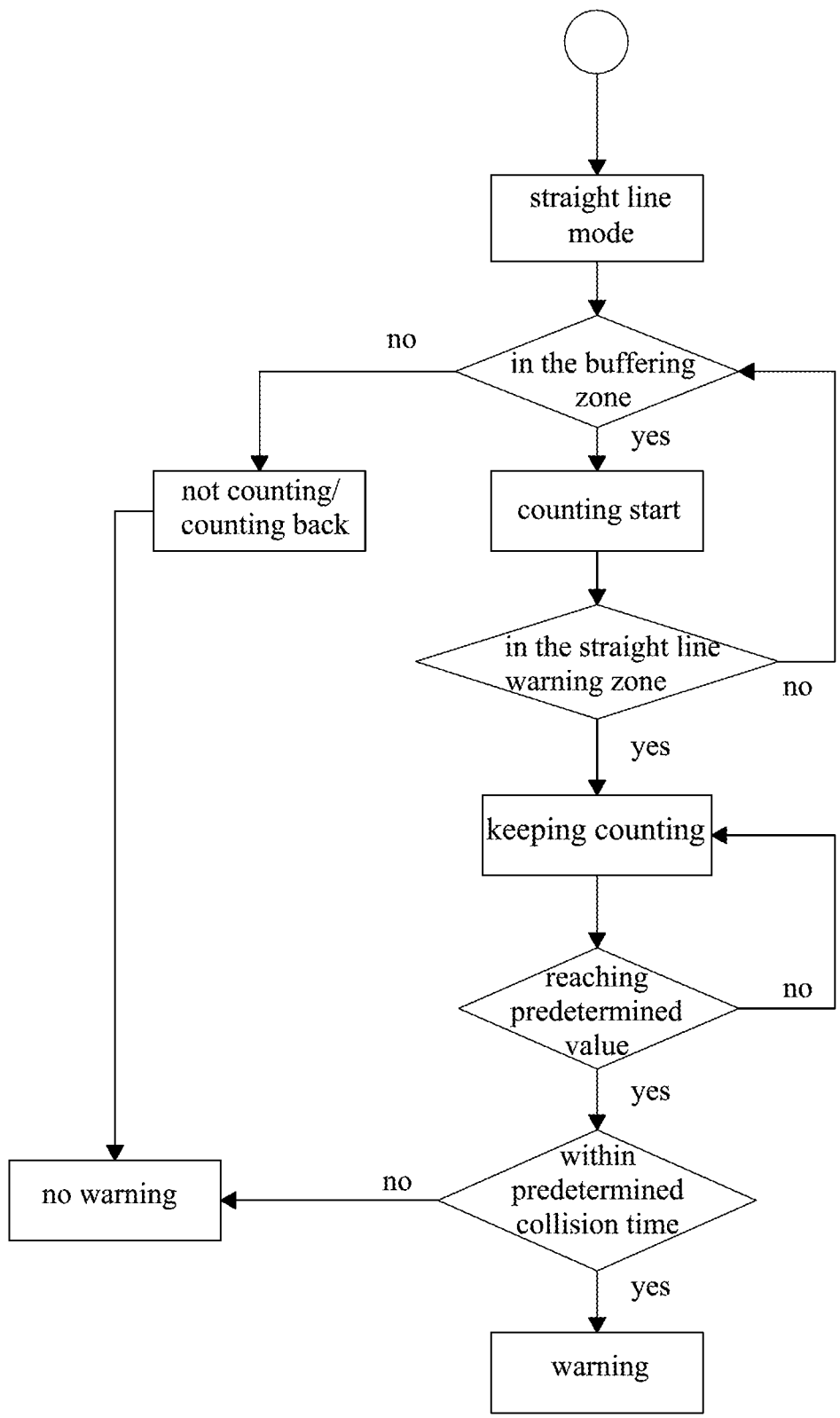
FIG. 2 is a flow chart illustrating the warning system and method in accordance with the first and second embodiments of the present invention under the straight line mode.

Referring to FIG. 2 in view of by FIG. 3, the process of detecting the approaching object V in the "straight line mode" is illustrated. When the approaching object V does not enter the buffering zone Z2, the counting process of the current count value is not triggered, meaning that the approaching object V does not enter the warning area L. In the meantime, the warning system 100 is in a stand by status. When the approaching object V enters the buffering zone Z2, the calculation of the confirmation condition is activated, which means that the current count value starts to count from 0 to 5 in the embodiment. In the process, if the approaching object V leaves the buffering zone Z2, the current count value stops increasing and starts to decrease back to the value 0. No matter the approaching object V is in the buffering zone Z2 or enters the straight line warning zone Z1 from the buffering zone Z2, the current count value will keep counting from 0 to 5. Once the current count value reaches the value of 5, based on the fact that the current count values reaches the predetermined count value, the processing unit 30 will determine that the moving path P of the approaching object V fulfills the confirmation condition in the warning area L.

Accordingly, if the processing unit 30 determines that the moving path P of the approaching object V is in the straight line warning zone Z1, and the moving path P of the approaching object V also fulfills the confirmation condition, in the embodiment, the processing unit 30 will further determine if the time to collision of the approaching object V is equal to or smaller than the predetermined collision time which is set as 3.5 seconds (in the 3.5 seconds range). In other words, when the processing unit 30 determines that the time to collision of the approaching object V is larger than the predetermined collision time of 3.5 seconds, the warning system 100 will not send the warning signal. On the contrary, if the processing unit 30 determines that the time to collision of the approaching object V is equal to or smaller than the predetermined collision time of 3.5 seconds, the approaching object V is deemed as a potentially dangerous vehicle which is in a dangerous status. Subsequently, the warning signal is outputted for providing the warning (such as a buzzer or flash). Therefore, the people in or beside the malfunctioned vehicle are aware of the potentially dangerous vehicle and allowed to duck as soon as possible.

Further referring to FIG. 4, similarly, the processing unit 30 determines that the moving path P of the approaching object V is in the straight line warning zone Z1, and the moving path P of the approaching object V also fulfills the confirmation condition. However, before the time to collision reaches within the predetermined collision time of 3.5 seconds, the approaching object V moves out of the straight line warning zone Z1. Even if the time to collision of the approaching object V reaches the predetermined collision time range in 3.5 seconds later, based on the fact that the approaching object V has moved out of the straight line warning zone Z1 and will not cause any danger upon the people in or beside the malfunctioned vehicle, the processing unit 30 will not output the warning signal, so as to prevent the people in or beside the malfunctioned vehicle from fearing or panicking.

Figure 5:
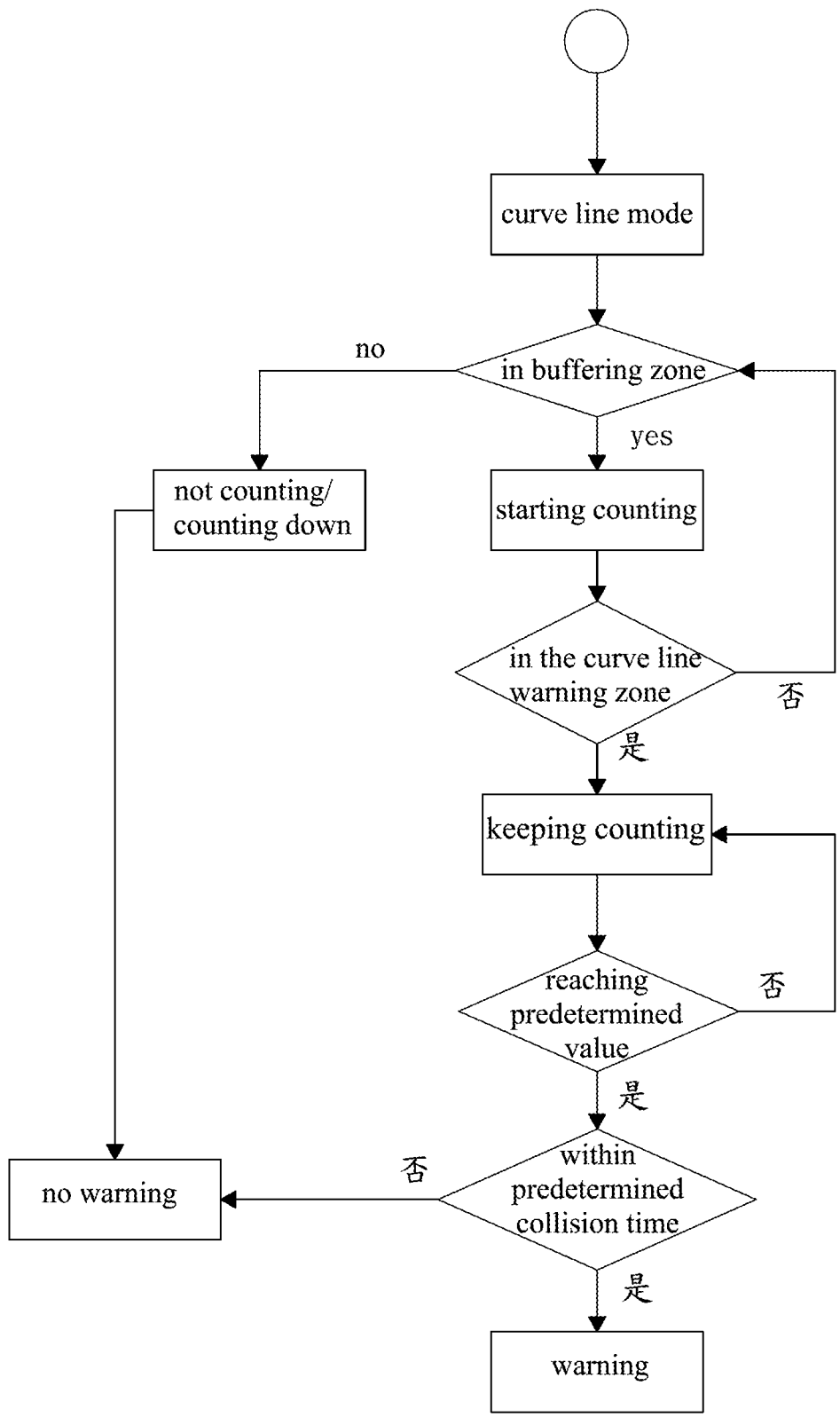
FIG. 5 is a flow chart illustrating the warning system and method in accordance with the first and second embodiments of the present invention in the curve line mode.
Figure 6:
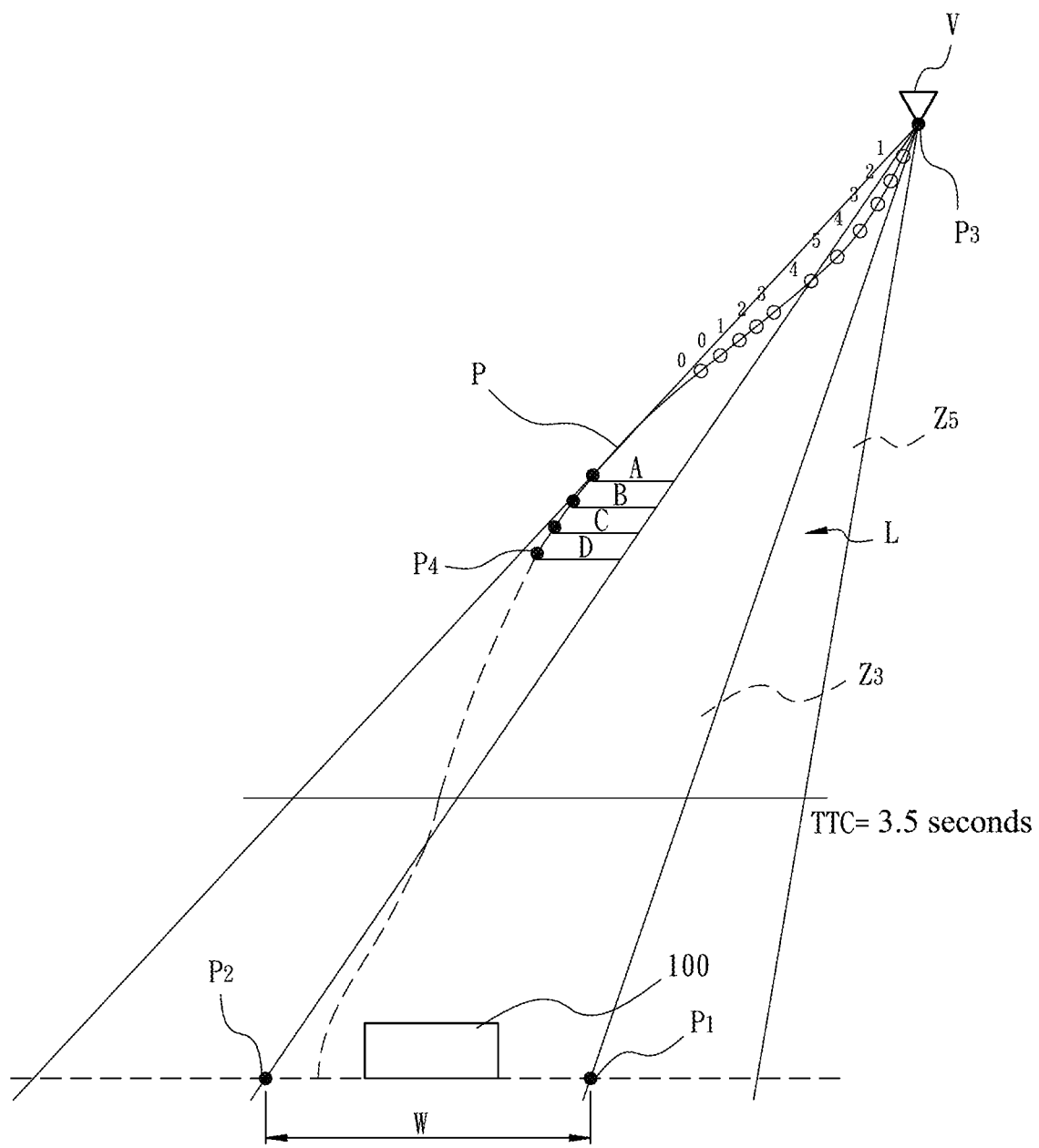
FIG. 6 is a schematic view of the warning system and method in accordance with the first embodiment of the present invention, illustrating that the approaching object is approaching but not reaching a warning triggering status.
Figure 7:
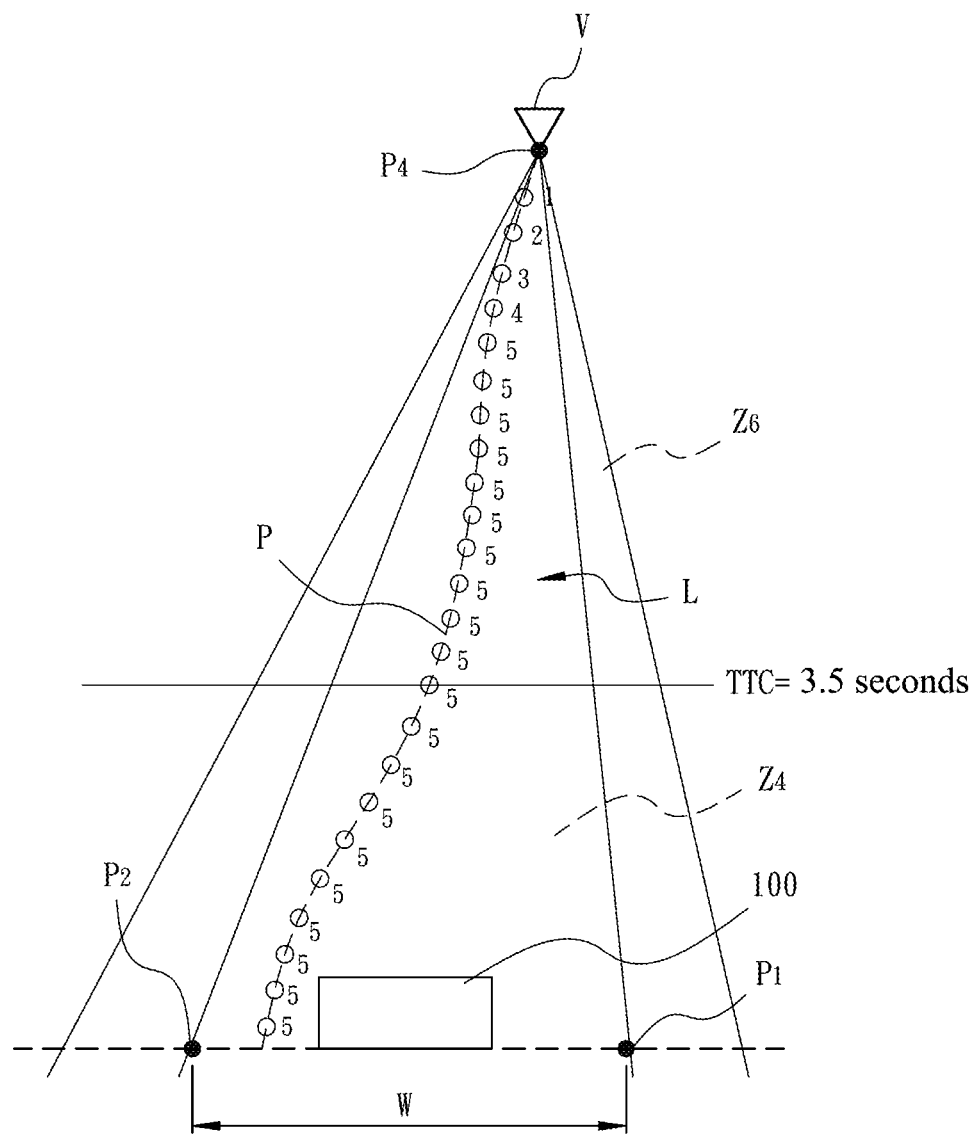
FIG. 7 is a schematic view of the warning system and method in accordance with the first embodiment of the present invention, illustrating that the approaching object is approaching and reaching a warning triggering status.

As shown by FIG. 6 and FIG. 7, in the "curve line mode" in the embodiment, a curve line warning zone Z3, Z4 is formed of a triangle area which is defined by the connections between a point P1, a point P2, and a point P3, wherein the point P1 and the point P2 are two distal end points of the predetermined width W, and the point P3 is the position of the approaching object V. Also, a buffering zone Z5, Z6 expands on two sides of the curve line warning zone Z3, Z4. As shown by FIG. 5, in view of FIG. 6, the process of detecting the approaching object V in the "curve line mode" is illustrated. When the approaching object V does not enter the curve line warning zone Z3, the counting process of the current count value is not triggered, meaning that the approaching object V does not enter the warning area L. In the meantime, the warning system 100 is in the stand by status. When the approaching object V enters the buffering zone Z5, the current count value starts to count from 0 to 5. In the process, if the approaching object V enters the curve line warning zone Z3 and the leave therefrom, the current count value stops increasing and starts to decrease back to the value 0.

Referring to FIG. 6 and FIG. 7, the moving path P of the approaching object V varies, such as leaving the curve line warning zone Z3, and a moving away condition is fulfilled. In the embodiment, the moving away condition is that when the moving path P of the approaching object V deviates away from the curve line warning zone Z3, four path points A, B, C, and D on the moving path P are captured (as shown by FIG. 6), such that the processing unit 30 compares path line from the first path point A to the fourth path point D to determine that the direction from point A to point D deviates from the curve line warning zone Z3. In such situation, a new curve line warning zone Z4 and buffering zone Z6 are defined by the point P1, the point P2, and the current position of the approaching object V which fulfills the moving away condition (as shown by FIG. 7). Such step is repeatedly carried out, until the confirmation condition is fulfilled and the processing unit 30 accordingly sends the warning signal, or until the approaching object V passes the detection unit 10 and leaves away. On the contrary, if the path line from the first path point A to the fourth path point D is not leaving away from the curve line warning zone Z3, the moving away condition is not fulfilled, wherein the original curve line warning zone Z3 will be maintained.

In the "curve line mode", when the approaching object V enters the buffering zone Z5 or Z6, the current count value counts from 0 to 5. Then, the approaching object V enters the curve line warning zone Z3 from the buffering zone Z5 or enters the curve line warning zone Z4 from the buffering zone Z6. When the current count value reaches the value of 5, based on the fact that the current count value reaches the predetermined count value, the processing unit 30 will determine that the moving path P of the approaching object V fulfills the confirmation condition in the warning area L.

Accordingly, if the processing unit 30 determines that the moving path P of the approaching object V is in the curve line warning zone Z3 or the curve line warning zone Z4, and the moving path P of the approaching object V also fulfills the confirmation condition, the processing unit 30 will then determine if the time to collision of the approaching object V is equal to or smaller than the predetermined collision time which is set as 3.5 seconds. In other words, when the processing unit 30 determines that the time to collision of the approaching object V is larger than the predetermined collision time of 3.5 seconds, the warning system 100 will not send the warning signal. On the contrary, if the processing unit 30 determines that the time to collision of the approaching object V is equal to or smaller than the predetermined collision time of 3.5 seconds (as shown by FIG. 7), the approaching object V is deemed as a potentially dangerous vehicle. Subsequently, the warning signal is outputted to provide the warning. Therefore, the people in or beside the malfunctioned vehicle are aware of the potentially dangerous vehicle and allowed to duck as soon as possible. However, if the approaching object V moves out of the curve line warning zone Z4 (not shown), even if the time to collision of the approaching object V reaches the predetermined collision time range, based on the fact that the approaching object V will not cause any danger upon the people in or beside the malfunctioned vehicle, the processing unit 30 will not output the warning signal, so as to prevent the people in or beside the malfunctioned vehicle from fearing or panicking.

Also referring to FIG. 8 to FIG. 14 in view of FIG. 2 and FIG. 5, the warning system 100 in accordance with the second embodiment of the present invention is illustrated. In the embodiment, the warning system 100 is disposed in a control area CA at the intersection of a rail R1 and a road R2. The warning system 100 comprises a plurality of detection units 10, a storage unit 20, and a processing unit 30. For facilitating the purpose of illustration, the control area CA in the embodiment is shown by a square shape area defined by the intersection of the rail R1 and a road R2. However, the scope of the control area CA is not limited by the square shape area herein. In the following embodiment, the approaching object V detected by the warning system 100 is, for example but not limited to, a moving vehicle. In other words, any objects that are approaching the warning system 100 can be considered as the target of detection, such as pedestrians or animals (such as cats and dogs).

Figure 9:
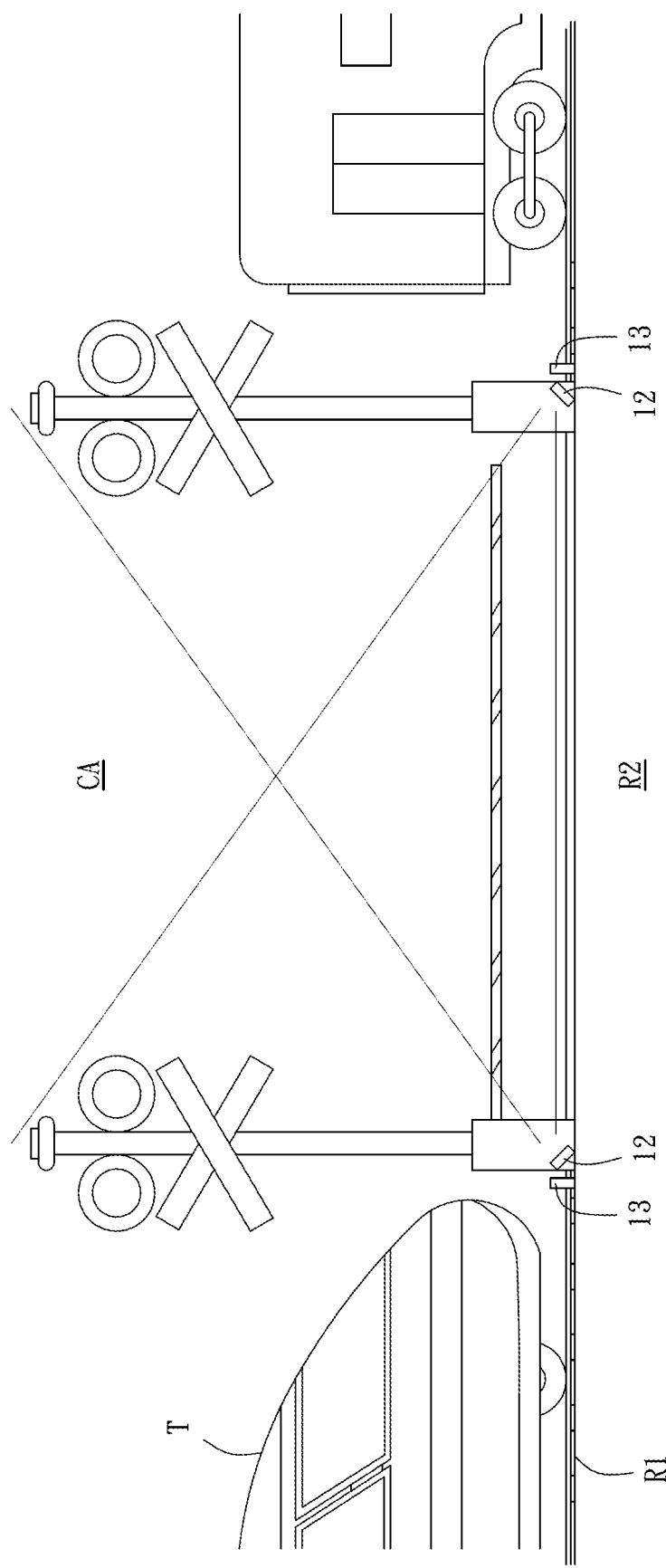
FIG. 9 is a schematic side view of the warning system in accordance with the second embodiment which is disposed in the control area of intersection of rail and road.
Figure 10:
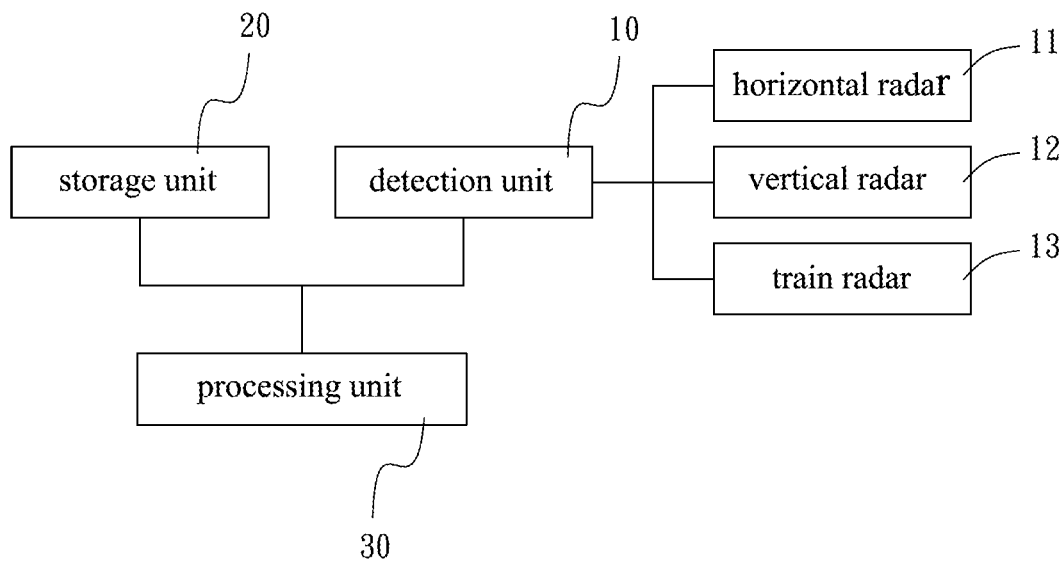
FIG. 10 is a block diagram of the warning system in accordance with the second embodiment of the present invention.

In the embodiment, the detection units 10 comprises a plurality of horizontal radars 11. In other words, each detection unit 10 comprises at least a horizontal radar 11. The horizontal radars 11 are disposed at opposite corners of the control area CA in a manner of face to face. The detection range of each horizontal radar 11 is arranged in horizontal orientation, so as to detect the moving path P of the approaching object V. In the embodiment, the detection units 10 further comprise a plurality of vertical radars 12 disposed on the road R2 face to face and arranged on two sides of the control area CA. The detection range of each vertical radar 12 is arranged in vertical orientation, so as to detect the approaching object V, which is going to enter the control area CA and placed at a height higher than the detection range of the horizontal radar 11. Preferably, the detection units 10 further comprise a plurality of train radars 13 disposed on the rail R1 and arranged on two sides of the intersection of the rail R1 and the adjacent road R2, so as to detect the train T entering or leaving the control area CA (as shown by FIG. 9). Therein, the operation frequencies of the horizontal radars 11 and the vertical radars 12 are about 79 GHz, and the operation frequency of the train radars 13 is about 77 GHz.

Figure 8:
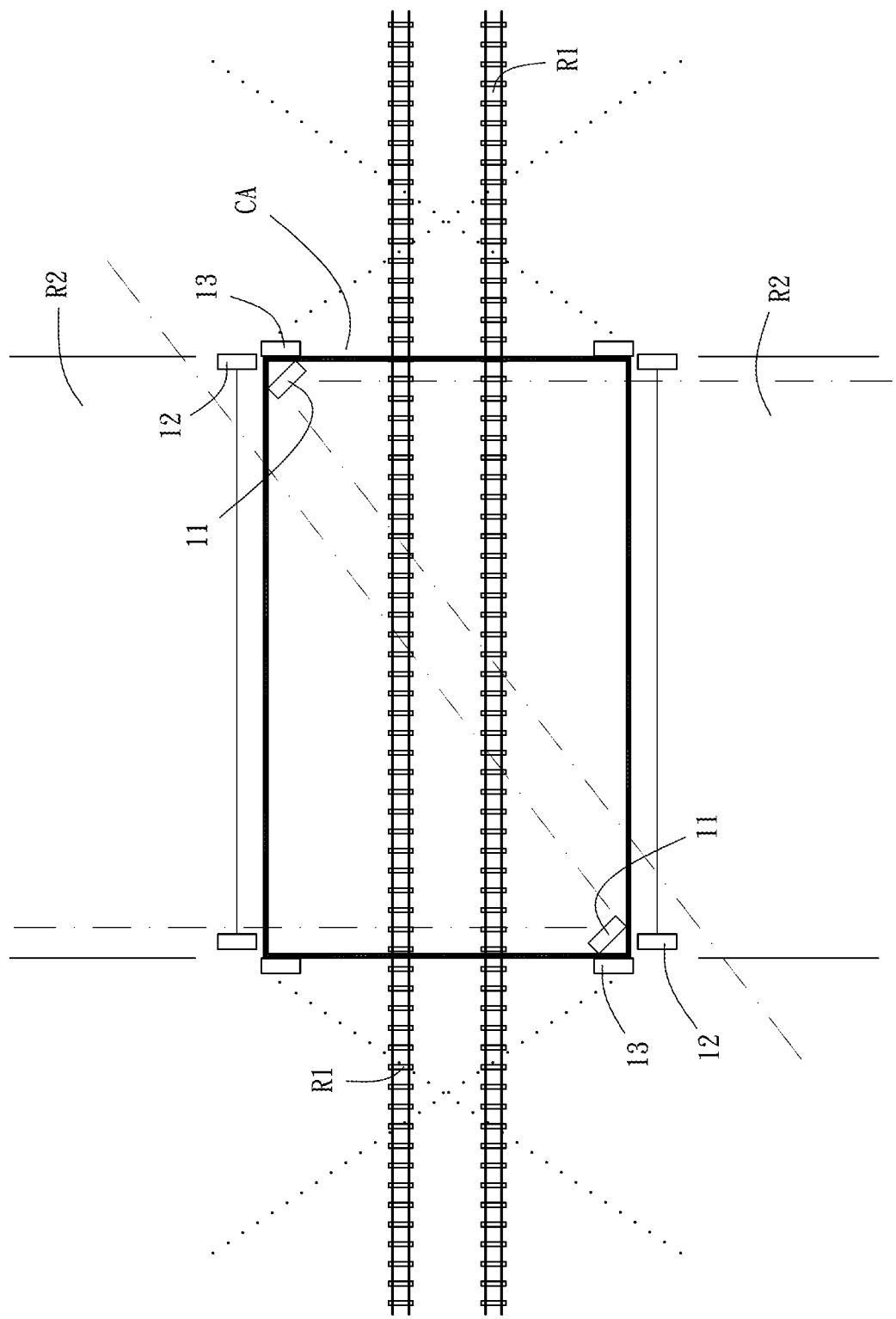
FIG. 8 is a schematic top view of the warning system in accordance with the second embodiment which is disposed in the control area of intersection of rail and road.

In a preferred embodiment, regarding the environment for the warning system 100, area of the control area CA on two sides of the road R2 is smaller than 15 meters. In the embodiment, two detection units 10 are provided, wherein each detection unit 10 comprises a horizontal radar 11. The two horizontal radar 11 are disposed at two opposite corners of the control area CA face to face (at 45 degrees in the drawing). Also, the scanning ranges of the two horizontal radars 11 are arranged at 45 degrees without overlapping each other (as shown by FIG. 8). Thus, the horizontal scanning ranges of the two horizontal radars 11 cover the control area CA, and the horizontal scanning range of each horizontal radar 11 extends toward the road R2. In the embodiment, the amount of the horizontal radars 11 and the 45-degree horizontal scanning ranges thereof are only for illustration purpose. In different embodiments, such as when the area of control area CA on two sides of the road R2 being larger than 15 meters, the horizontal radars 11 can be disposed at four corners in the control area CA in diagonally facing arrangement (not shown). Further, the horizontal radars 11 can be those having different horizontal scanning angles, such as the radars having a scanning angle from 60 to 120 degrees.

Preferably, each detection unit 10 further comprises two vertical radars 12 and two train radars 13. The vertical radars 12 are disposed on two sides of the road R2 in a manner of face to face, with a vertical oriented scanning range, so as to detect any approaching objects V, which are going to enter the control area CA and placed at a height higher than the detection range of the horizontal radar 11, such as a crane having a suspension arm (not shown). When the crane is to pass through the control area CA, the horizontal radar 11 is able to detect the tires and vehicle body of the crane. However, the suspension arm which protrudes above the vehicle head is possibly out of the height of the detection range of the horizontal radar 11. Therefore, by vertically scanning with the vertical radar 12, the crane and the suspension arm can both be detected, so that the vertical radar 12 provides assistance for detecting the approaching object V. Thus, the approaching object V entering the control area CA is comprehensively detected. The train radars 13 are applied for detecting the train entering and leaving the control area CA. The train radar 13 herein replaces the conventional axle counter for detecting the train entering and leaving the control area CA.

Accordingly, the plurality of detection units 10 comprise at least two transmission frequencies. Taking the two horizontal radars 11 as an example, the operation frequency thereof is about 79 GHz. Therefore, the operation frequencies of the two horizontal radars 11 are able to be divided and separated, such as one operation frequency thereof is 79.3 GHz, and the other operation frequency thereof is 79.6 GHz, thereby preventing the interference of two identical operation frequencies of the horizontal radars 11 from occurring. In other words, the operation frequencies of each horizontal radar 11 are different. The two vertical radars 12 and the two train radars 13 can have the same frequency division mechanism for preventing interference.

In addition, such frequency division mechanism achieves a fast warning effect. If twelve horizontal radars 11 are disposed in the control area CA and operate at four operation frequency bands, it means that three horizontal radars 11 work at an identical operation frequency. If the reaction time of each horizontal radar 11 is 50 ms, for preventing interference caused by same operation frequencies, the scanning time of the three horizontal radars 11 are staggered, and each horizontal radar 11 carries out a scanning confirmation for five times at a single position (preventing loss of scanning signal, and increase reliability of the signal feedback). When the horizontal radars 11 with different operation frequencies are able to simultaneously scan, the twelve horizontal radars 11 can finish the scanning in 150 ms, such that the processing unit 30 can carry out the identification of the approaching object V for the first time. If the scanning of the twelve horizontal radars 11 are staggered by time division (each horizontal radar 11 taking a reaction time of 50 ms for staggering the scanning), instead of the frequency division mechanism, the twelve radars have to cost 600 ms to finish the scanning for the processing unit 30 to carry out the identification for the first time. Therefore, the frequency division mechanism facilitates the reaction more efficiently and improves the effect of collision prediction.

In the embodiment, the horizontal radars 11 of a plurality of detection units 10 detect a moving path P of an approaching object V moving toward the control area CA along the road R2, and the moving path P is transformed into a detection signal to be outputted. The storage unit 20, as in the first embodiment, is applied for storing the warning information, which also comprises the warning area L and the confirmation condition. The warning area L is set in the detection area. The confirmation condition is for confirming that the approaching object V is continuously moving in the warning area L. The processing unit 30 is electrically connected with the detection unit 10 and the storage unit 20 for receiving the detection signal outputted by the detection unit 10, so as to acquire the real-time moving path P of the approaching object V.

In the embodiment, the confirmation is the same as in the first embodiment. The predetermined count value is also 5, and the current count value also starts from 0 to 5. When the approaching object V is out of the warning area L, the current count value remains at 0. When the approaching object V enters the warning area L, the current count value starts to count. When the current count value is equal to 5, the current count values reaches the predetermined count value. The predetermined count value and the current count value are allowed to be adjusted based on different situations and not limited to the aforementioned values.

In the embodiment, the horizontal radar 11 is applied for detecting a relative distance with respect to the approaching object V in the detection area, so as to acquire a time to collision (TTC). Therein, the relative distance detected by the horizontal radar 11 is differentiated to acquire a relative speed of the approaching object V, and the relative distance is divided by the relative speed for acquiring the time to collision. In the embodiment, the warning information, as in the first embodiment, also comprises a predetermined collision time, which is also set at approximate 3.5 seconds. In the embodiment, when the moving path P of the approaching object V is in the warning area L, with the aforementioned confirmation condition fulfilled, and the time to collision is equal to or smaller than the predetermined collision time, the processing unit sends out a warning signal.

The requirement for the processing unit 30 to send out the warning signal is not limited to the situation that the time to collision is equal to or smaller than the predetermined collision time. In other words, once the moving path P of the approaching object V is detected as being in the warning area L and the aforementioned confirmation condition is fulfilled, the processing unit 30 sends out the warning signal. The requirement of that the processing unit 30 determining the time to collision being equal to or smaller than the predetermined collision time is only for illustration purpose and shall not be considered as a limitation on the present invention.

Figure 11:
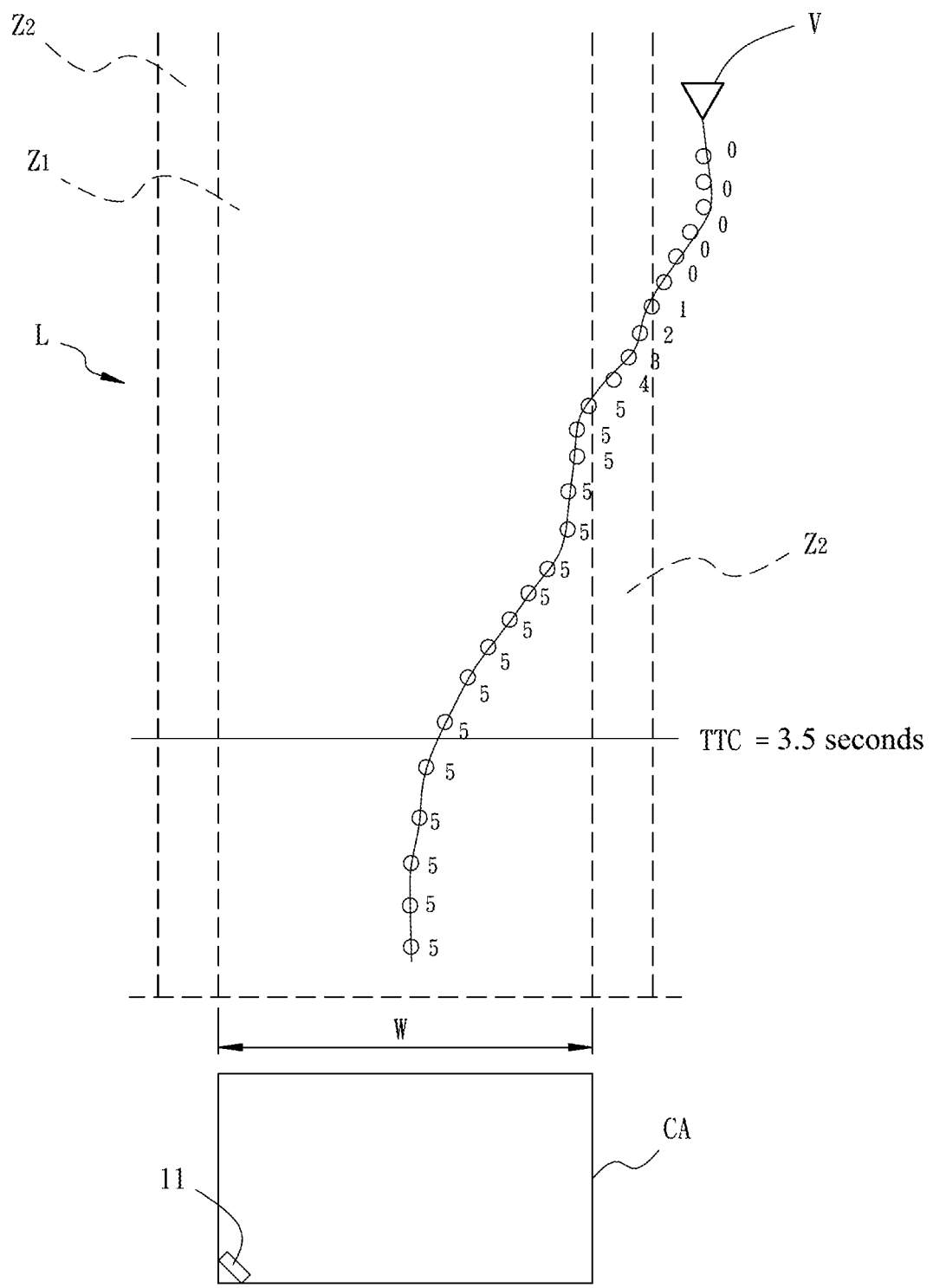
FIG. 11 is a schematic view of the warning system in accordance with the second embodiment of the present invention, illustrating the system detecting that the approaching object is approaching and reaching the warning triggering status in the linear mode, wherein only one horizontal scan radar detecting the road on one side of the control area is shown in the figure, while another horizontal scan radar which works in the same way is not shown.
Figure 12:
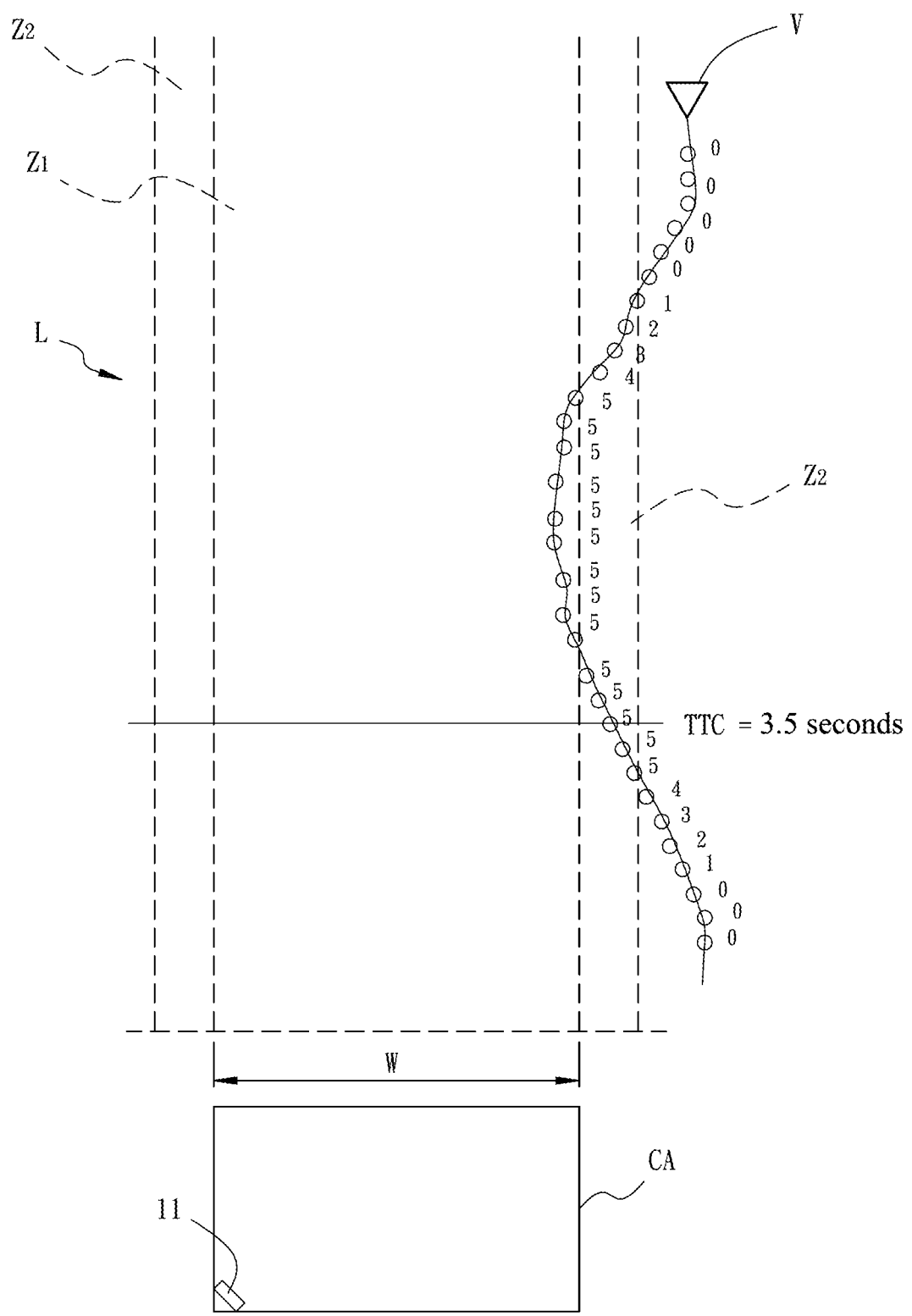
FIG. 12 is a schematic view of the warning system in accordance with the second embodiment of the present invention, illustrating the system detecting that the approaching object is approaching but not reaching the warning triggering status in the linear mode, wherein only one horizontal scan radar detecting the road on one side of the control area is shown in the figure, while another horizontal scan radar which works in the same way is not shown.

In the embodiment, the warning system 100 for detecting approaching object also includes a "straight line mode" and a "curve line mode". As shown by FIG. 11 and FIG. 12, in the straight line mode, the warning area L includes a straight line warning zone Z1 and a buffering zone Z2. The buffering zone Z2 expands outward from the straight line warning zone Z1. The straight line warning zone Z1 is formed of an expansion of the predetermined width W which is detectable by the horizontal radar 11. In the embodiment, the straight line warning zone Z1 is formed by a straight expansion of the predetermined width W expanding toward a same direction, and the buffering zone Z2 is an expansion of the straight line warning zone Z1 which symmetrically expands toward two sides thereof by an identical distance.

Referring to FIG. 2 in view of by FIG. 11, the process of detecting the approaching object V in the "straight line mode" is illustrated. When the approaching object V does not enter the buffering zone Z2, the counting process of the current count value is not triggered, meaning that the approaching object V does not enter the warning area L. In the meantime, the warning system 100 is in a standby status. When the approaching object V enters the buffering zone Z2, the calculation of the confirmation condition is activated, which means that the current count value starts to count from 0 to 5 in the embodiment. In the process, if the approaching object V leaves the buffering zone Z2, the current count value stops increasing and starts to decrease back to the value 0. No matter the approaching object V is in the buffering zone Z2 or enters the straight line warning zone Z1 from the buffering zone Z2, the current count value will keep counting from 0 to 5. Once the current count value reaches the value of 5, based on the fact that the current count values reaches the predetermined count value, the processing unit 30 will determine that the moving path P of the approaching object V fulfills the confirmation condition in the warning area L.

Accordingly, if the processing unit 30 determines that the moving path P of the approaching object V is in the straight line warning zone Z1, and the moving path P of the approaching object V also fulfills the confirmation condition, in the embodiment, the processing unit 30 will further determine if the time to collision of the approaching object V is equal to or smaller than the predetermined collision time which is set as 3.5 seconds (in the 3.5 seconds range). In other words, when the processing unit 30 determines that the time to collision of the approaching object V is larger than the predetermined collision time of 3.5 seconds, the warning system 100 will not send the warning signal. On the contrary, if the processing unit 30 determines that the time to collision of the approaching object V is equal to or smaller than the predetermined collision time of 3.5 seconds, the approaching object V is deemed as a potentially dangerous vehicle which is in a dangerous status. Subsequently, the warning signal is outputted for providing the warning (such as a buzzer or flash). Therefore, the train T and the vehicles and people beside the control area CA are aware of the potentially dangerous vehicle and allowed to cope as soon as possible.

Further referring to FIG. 2, if the processing unit 30 similarly determines that the moving path P of the approaching object V is in the straight line warning zone Z1, and the moving path P of the approaching object V also fulfills the confirmation condition, but the approaching object V moves out of the straight line warning zone Z1 before the time to collision reaches within the predetermined collision time of 3.5 seconds, even if the time to collision of the approaching object V reaches the predetermined collision time range in 3.5 seconds later, based on the fact that the approaching object V has moved out of the straight line warning zone Z1 and will not cause any danger upon the people in or beside the malfunctioned vehicle, the processing unit 30 will not output the warning signal, so as to prevent the people in the control area CA from fearing or panicking.

Figure 13:
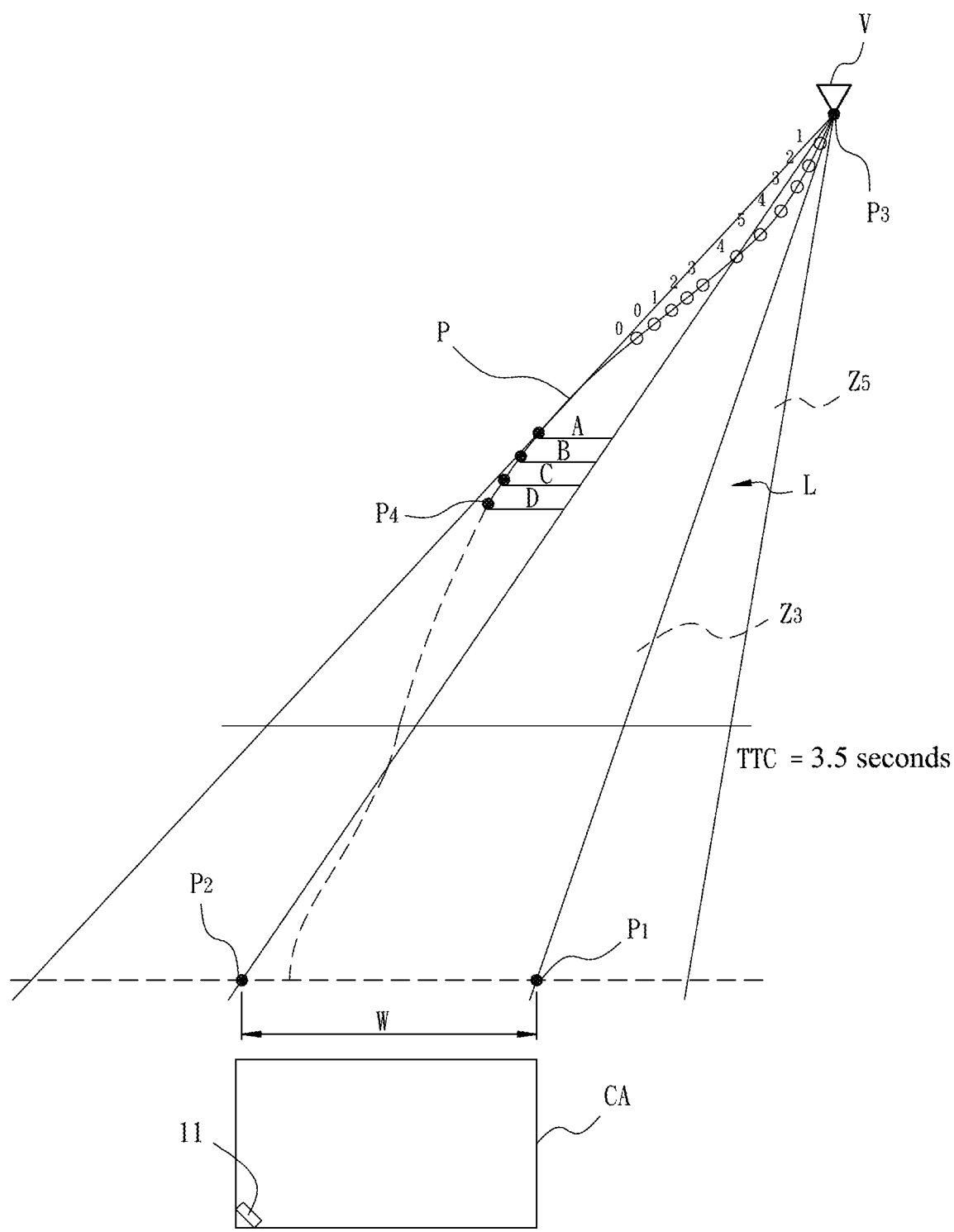
FIG. 13 is a schematic view of the warning system in accordance with the second embodiment of the present invention, illustrating the system detecting that the approaching object is approaching but not reaching the warning triggering status in the curve line mode, wherein only one horizontal scan radar detecting the road on one side of the control area is shown in the figure, while another horizontal scan radar which works in the same way is not shown.
Figure 14:
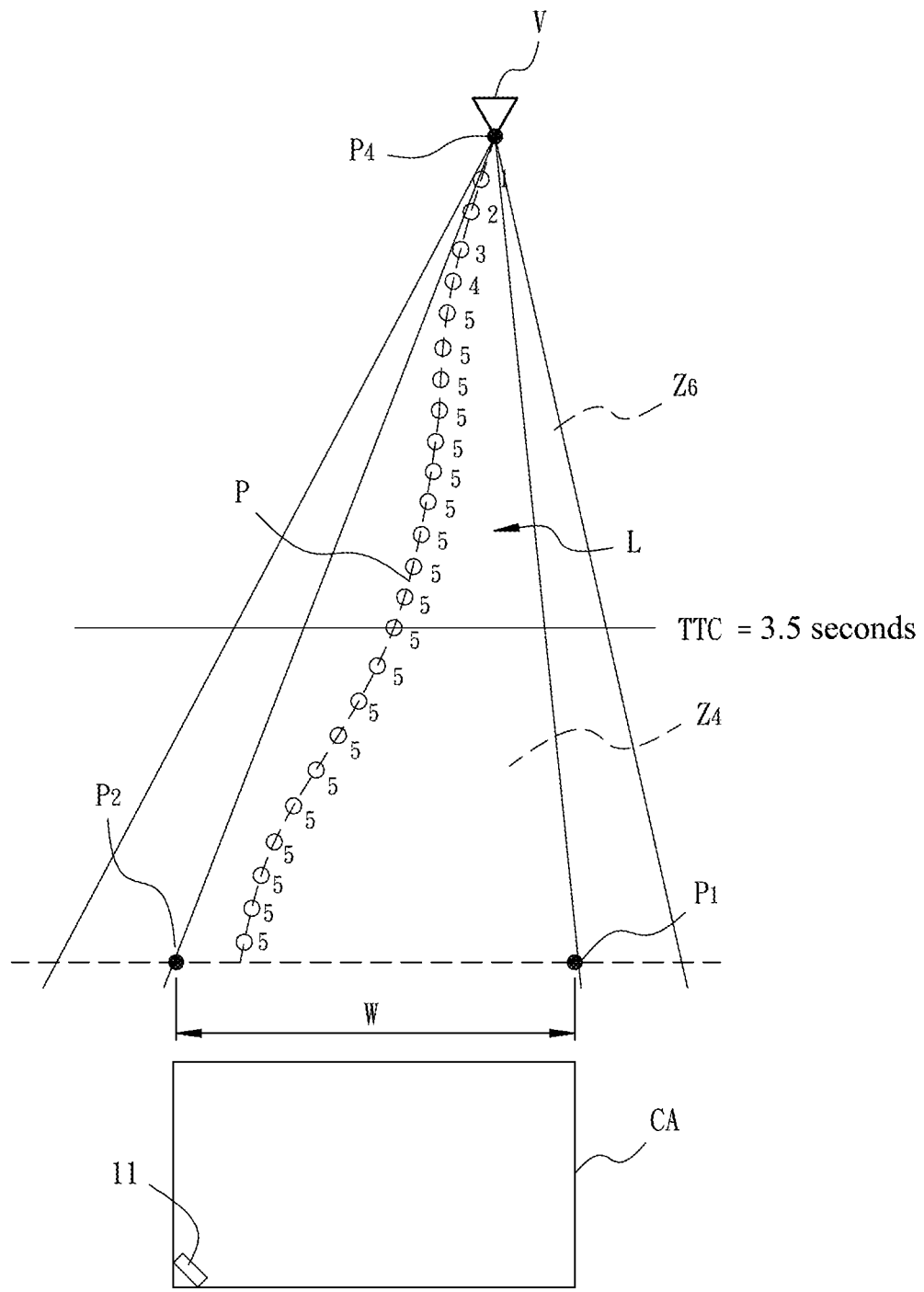
FIG. 14 is a schematic view of the warning system in accordance with the second embodiment of the present invention, illustrating the system detecting that the approaching object is approaching and reaching the warning triggering status in the linear mode, wherein only one horizontal scan radar detecting the road on one side of the control area is shown in the figure, while another horizontal scan radar which works in the same way is not shown.

As shown by FIG. 13 and FIG. 14, in the "curve line mode" in the embodiment, a curve line warning zone Z3, Z4 is formed of a triangle area which is defined by the connections between a point P1, a point P2, and a point P3, wherein the point P1 and the point P2 are two distal end points of the predetermined width W, and the point P3 is the position of the approaching object V. Also, a buffering zone Z5, Z6 expands on two sides of the curve line warning zone Z3, Z4. As shown by FIG. 5, in view of FIG. 13, the process of detecting the approaching object V in the "curve line mode" is illustrated. When the approaching object V does not enter the curve line warning zone Z3, the counting process of the current count value is not triggered, meaning that the approaching object V does not enter the warning area L. In the meantime, the warning system 100 is in the stand by status. When the approaching object V enters the buffering zone Z5, the current count value starts to count from 0 to 5. In the process, if the approaching object V enters the curve line warning zone Z3 and the leave therefrom, the current count value stops increasing and starts to decrease back to the value 0.

Referring to FIG. 13 and FIG. 14, the moving path P of the approaching object V varies, such as leaving the curve line warning zone Z3, and a moving away condition is fulfilled. In the embodiment, the moving away condition is that when the moving path P of the approaching object V deviates away from the curve line warning zone Z3, four path points A, B, C, and D on the moving path P are captured (as shown by FIG. 13), such that the processing unit 30 compares path line from the first path point A to the fourth path point D to determine that the direction from point A to point D deviates from the curve line warning zone Z3. In such situation, a new curve line warning zone Z4 and buffering zone Z6 are defined by the point P1, the point P2, and the current position of the approaching object V which fulfills the moving away condition (as shown by FIG. 14). Such step is repeatedly carried out, until the confirmation condition is fulfilled and the processing unit 30 accordingly sends the warning signal, or until the approaching object V passes the horizontal radar 11 and leaves away. On the contrary, if the path line from the first path point A to the fourth path point D is not leaving away from the curve line warning zone Z3, the moving away condition is not fulfilled, wherein the original curve line warning zone Z3 will be maintained.

In the "curve line mode", when the approaching object V enters the buffering zone Z5 or Z6, the current count value counts from 0 to 5. Then, the approaching object V enters the curve line warning zone Z3 from the buffering zone Z5 or enters the curve line warning zone Z4 from the buffering zone Z6. When the current count value reaches the value of 5, based on the fact that the current count value reaches the predetermined count value, the processing unit 30 will determine that the moving path P of the approaching object V fulfills the confirmation condition in the warning area L.

Accordingly, if the processing unit 30 determines that the moving path P of the approaching object V is in the curve line warning zone Z3 or the curve line warning zone Z4, and the moving path P of the approaching object V also fulfills the confirmation condition, the processing unit 30 will then determine if the time to collision of the approaching object V is equal to or smaller than the predetermined collision time which is set as 3.5 seconds. In other words, when the processing unit 30 determines that the time to collision of the approaching object V is larger than the predetermined collision time of 3.5 seconds, the warning system 100 will not send the warning signal. On the contrary, if the processing unit 30 determines that the time to collision of the approaching object V is equal to or smaller than the predetermined collision time of 3.5 seconds (as shown by FIG. 14), the approaching object V is deemed as a potentially dangerous vehicle. Subsequently, the warning signal is outputted for provide the warning. Therefore, the train T and vehicles and people beside the control area CA are aware of the potentially dangerous vehicle and allowed to cope as soon as possible. However, if the approaching object V moves out of the curve line warning zone Z4 (not shown), even if the time to collision of the approaching object V reaches the predetermined 3.5 seconds collision time range, based on the fact that the approaching object V will not cause any danger upon the people in the control area CA, the processing unit 30 will not output the warning signal.

In the embodiment, the descriptions above illustrate the operation in the "straight line mode" and the "curve line mode", respectively. In practical application, two modes are allowed to be independently executed for detecting the approaching object V, or simultaneously or alternately executed for detecting the approaching object V. Therefore, the application of the detection modes is flexible, further preventing possible incorrect judgement.

With the foregoing configuration, the warning system 100 and method for detecting an approaching object V provided by the present invention achieve following effects and functions.

Regarding the warning system 100 for detecting approaching object provided by the present invention, in the first embodiment of the present invention, when the moving path P of the approaching object V is in the warning area L, and the confirmation condition is fulfilled, the approaching object V is confirmed as continuously moving in the warning area L. As described in the first embodiment, when the requirements above are met, the processing unit 30 determines that the approaching object V is deemed as a potentially dangerous object, such that the processing unit 30 sends out the warning signal, thereby preventing incorrect identification, further preventing people from fearing or panicking due to an incorrect warning.

In the second embodiment, when the moving path P of the approaching object V is in the warning area L, and the confirmation condition is fulfilled, the approaching object V is confirmed as continuously moving in the warning area L and toward the control area CA. Therefore, the approaching object V is deemed as a potentially dangerous object, such that the processing unit 30 sends out the warning signal, thereby immediately notifying the train T which is going to enter the control area CA to stop, preventing the approaching object V and the train T from collision in the control area CA, thus achieving an automatic warning and avoiding serious accident in the control area CA.

Also in the second embodiment of the present invention, besides horizontally scanning and detecting the moving path P of the approaching object V with the horizontal radars 11, the vertical radars 12 are further included, which are disposed face to face on the road R2 and carry out vertical oriented detection. When the approaching object V (such as the crane aforementioned) positioned at a height above the detection range of the horizontal radars 11 and about to enter the control area CA, the approaching object V is comprehensively detected and prevented from detection omission. Also, the present invention further comprises the train radars 13 for detecting the train T entering and leaving the control area CA, so as to resolve the incorrect detection issue of conventional axle counters and improve the detection accuracy.

In the first and second embodiments, the detection unit 10 is applied for detecting the time to collision of the approaching object. Besides the moving path P of the approaching object V has to be in the warning area L and the confirmation condition has to be fulfilled, the time to collision has to be within the predetermined collision time, so that the processing unit 30 determines that the approaching object V is potentially dangerous and accordingly sends out the warning signal. Therefore, the present invention applies the time to collision as an assistance for identifying if the approaching object V will cause danger.

In the first and second embodiments, when the moving path P of the approaching object V enters from a lateral side, the curve mode of the present invention facilitates an optimal detection and warning performance. Also, the range of the warning zone is allowed to be adjusted according to the moving path P of the approaching object V (such as the curve line warning zone Z3 being adjusted into the curve line warning zone Z4 in the embodiment), thereby accurately detecting the moving path P of the approaching object V.

Additionally, in the first and second embodiments, the detection unit 10 is a radar detection module, which has a first detection times when detecting the approaching object V moving out of the buffering zone Z2, Z5, Z6, and has a second detection times when detecting the approaching object V moving in the buffering zone Z2, Z5, Z6. In a same detection duration, the second detection times is larger than the first detection times. For example, when the approaching object V moves out of the buffering zone Z2, Z5, Z6, the detection unit 10 carries out the detection by a first detection times, such as a slow detection mode of 50 times/sec. When the approaching object V moves in the buffering zone Z2, Z5, Z6, the detection unit 10 carries out the detection by a second detection times, such as a fast detection mode of 500 time/sec. Therein, the slow detection mode in which the approaching object V moving out of the buffering zone Z2, Z5, Z6 achieves an energy saving effect than the fast detection mode, so as to save energy in the detection of the detection unit 10.

Also, in the first and second embodiments, when the approaching object V moves in the buffering zone Z2, Z5, Z6, the warning signal begins to be sent out. When the approaching object V moves in the warning zone Z1, Z3, Z4, the warning signal has a higher warning level compared with the warning signal sent out when the approaching object V moves in the buffering zone Z2, Z5, Z6. In other words, when the approaching object V moves in the buffering zone Z2, Z5, Z6, the warning level of the warning signal is lower (such as a small buzzer sound or slower flashing frequency of the warning light), so that people is allowed to be aware of the situation when the approaching object V moves in the buffering zone Z2, Z5, Z6. When the approaching object V moves in the warning zone Z1,Z3,Z4, the warning level increases (such as a larger buzzer sound or faster flashing frequency of the warning light), thereby notifying people of the situation and to duck as soon as possible.

Additionally, in the first embodiment, the detection of the warning system 100 on the approaching object V is illustrated with the warning system 100 being disposed on a malfunctioned vehicle or a traffic cone. However, the operation situation is not limited by the embodiments herein. The warning system 100 is allowed to be disposed on a moving vehicle for carrying out the detection, such as being disposed on a lateral rear side of the vehicle. When the vehicle backs, the warning system 100 is also able to detect the approaching objects on the rear or rear lateral direction of the vehicle. When the approaching object is detected, the warning signal is sent out, achieving a collision prevention function in the backing duration of the vehicle.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A warning system for detecting an approaching object, the system comprising:
   a detection unit detecting a moving path of the approaching object in a detection area, the moving path being transformed into a detection signal to be outputted;
   a storage unit storing a warning information, the warning information comprising a warning area set in the detection area, and a confirmation condition for confirming that the approaching object continuously moves in the warning area, the warning area comprising a warning zone and a buffering zone, the warning zone being formed of an expansion of a predetermined width which is detectable by the detection unit, the buffering zone expanding out of the warning zone, a confirmation operation of the confirmation condition being activated when the approaching object entering the buffering zone; and
   a processing unit electrically connected with the detection unit and the storage unit, the processing unit receiving the detection signal to acquire the current moving path of the approaching object;

when the moving path is determined as falling in the warning area, and the moving path fulfills the confirmation condition, the processing unit sends out a warning signal.

2. The warning system of claim 1, wherein the detection unit detects a relative distance of the approaching object in the detection area to acquire a time to collision; the warning information comprises a predetermined collision time; the processing unit receives the detection signal to acquire the current time to collision of the approaching object; when the moving path falls in the warning zone and fulfills the confirmation condition, and when the time to collision is determined as being equal to or smaller than the predetermined collision time, the processing unit sends out the warning signal.

3. The warning system of claim 1, wherein the confirmation condition is a predetermined count value; when the approaching object enters the buffering zone, a current count value will starts to count; if the current count value reaches the predetermined count value, the processing unit determines that the moving path fulfills the confirmation condition in the warning zone; if the current count value does not reach the predetermined count value, the processing unit determines that the moving path does not fulfill the confirmation condition in the warning zone.

4. The warning system of claim 3, wherein the warning zone is a straight line warning zone formed by a straight expansion of the predetermined width expanding toward a same direction, and the buffering zone symmetrically expands toward two sides of the straight line warning zone by an identical distance.

5. The warning system of claim 1, wherein the warning zone is a curve line warning zone formed of a triangle area which is defined by a connection between three points, wherein two of the three points are two distal end points of the predetermined width, and the last one of the three point is a position of the approaching object; when the moving path of the approaching object leaves the curve line warning zone and a moving away condition is fulfilled, the curve line warning zone is redefined by a triangle area formed of a connection between the two distal ends of the predetermined width and a position at where the approaching object is when fulfilling the moving away condition; such operation is repeatedly carried out until the moving path fulfills the confirmation condition and the processing unit accordingly sends the warning signal, or until the approaching object passes the detection unit and leaves away.

6. The warning system of claim 5, wherein the moving away condition is that when the approaching object moves away from the curve line warning zone, a plurality of path points are captured along the moving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

7. The warning system of claim 4, further comprising a curve line warning zone formed of a triangle area which is defined by a connection between three points, wherein two of the three points are two distal end points of the predetermined width, and the last one of the three point is a position of the approaching object; when the moving path of the approaching object leaves the curve line warning zone and a moving away condition is fulfilled, the curve line warning zone is redefined by a triangle area formed of a connection between the two distal ends of the predetermined width and a position at where the approaching object is when fulfilling the moving away condition; such operation is repeatedly carried out until the confirmation condition is fulfilled and the processing unit accordingly sends the warning signal, or until the approaching object passes the detection unit and leaves away.

8. The warning system of claim 7, wherein the moving away condition is that when the approaching object moves away from the curve line warning zone, a plurality of path points are captured along the moving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

9. A warning method for detecting an approaching object, comprising following steps:
detecting a moving path of the approaching object with a detection unit, transforming the moving path into a detection signal, and outputting the detection signal;
storing a warning information with a storage unit, the warning information including a warning area set in the detection area, and a confirmation condition for confirming that the approaching object continuously moves in the warning area, the warning area comprising a warning zone and a buffering zone, the warning zone being formed of an expansion of a predetermined width which is detectable by the detection unit, the buffering zone expanding out of the warning zone; and
receiving the detection signal with a processing unit which is electrically connected with the detection unit and the storage unit to acquire the current moving path of the approaching object, such that when the moving path falls in the warning area and fulfills the confirmation condition, the processing unit sends out a warning signal.

10. The method of claim 9, wherein the detection unit detects a relative distance of the approaching object in the detection area to acquire a time to collision; the warning information comprises a predetermined collision time; the processing unit receives the detection signal to acquire the current time to collision of the approaching object; when the moving path falls in the warning zone and fulfills the confirmation condition, and when the time to collision is determined as being equal to or smaller than the predetermined collision time, the processing unit sends out the warning signal.

11. The method of claim 9, wherein the confirmation condition is a predetermined count value; when the approaching object enters the buffering zone, a current count value starts to count; if the current count value reaches the predetermined count value, the processing unit determines that the moving path fulfills the confirmation condition in the warning zone; if the current count value does not reach the predetermined count value, the processing unit determines that the moving path does not fulfill the confirmation condition in the warning zone.

12. The method of claim 11, wherein the warning zone is a straight line warning zone formed by a straight expansion of the predetermined width expanding toward a same direction, and the buffering zone is an expansion of the straight line warning zone symmetrically expands toward two sides of the straight line warning zone by an identical distance.

13. The method of claim 9, wherein the warning zone is a curve line warning zone formed of a triangle area which is defined by a connection between three points, wherein two of the three points are two distal end points of the predetermined width, and the last one of the three point is a position of the approaching object; when the moving path of the approaching object leaves the curve line warning zone and a moving away condition is fulfilled, the curve line warning zone is redefined by a triangle area formed of a connection between the two distal ends of the predetermined width and a position at where the approaching object is when fulfilling the moving away condition; such operation is repeatedly carried out until the moving path fulfills the confirmation condition and the processing unit accordingly sends the warning signal, or until the approaching object passes the detection unit and leaves away.

14. The method of claim 13, wherein the moving away condition is that when the approaching object moves away from the curve line warning zone, a plurality of path points are captured along the moving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

15. The method of claim 12, further comprising a curve line warning zone formed of a triangle area which is defined by a connection between three points, wherein two of the three points are two distal end points of the predetermined width, and the last one of the three point is a position of the approaching object; when the moving path of the approaching object leaves the curve line warning zone and a moving away condition is fulfilled, the curve line warning zone is redefined by a triangle area formed of a connection between the two distal ends of the predetermined width and a position at where the approaching object is when fulfilling the moving away condition; such operation is repeatedly carried out until the moving path fulfills the confirmation condition and the processing unit accordingly sends the warning signal, or until the approaching object passes the detection unit and leaves away.

16. The method of claim 15, wherein the moving away condition is that when the approaching object moves away from the curve line warning zone, a plurality of path points are captured along the moving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

17. The method of claim 9, wherein the detection unit is a radar detection module, which has a first detection times when detecting the approaching object as moving out of the buffering zone, and has a second detection times when detecting the approaching object as moving in the buffering zone; in a same detection duration, the second detection times is larger than the first detection times.

18. The method of claim 9, wherein when the approaching object moves in the warning zone, the warning signal sent by the processing unit has a higher warning level compared with the warning signal sent out by the processing unit when the approaching object moves in the buffering zone.

19. A warning system for detecting an approaching object, the warning system being disposed in a control area at an intersection of rail and/or road, the warning system comprising:
a plurality of detection units having least two transmission frequencies for detecting a moving path of an approaching object which is approaching the control area along the road, the moving path being transformed into a detection signal to be outputted;
a storage unit storing a warning information, the warning information comprising a warning area, and a confirmation condition for confirming that the approaching object continuously moves in the warning area; and
a processing unit electrically connected with the plurality of detection units and the storage unit, the processing unit receiving the detection signal to acquire the current moving path of the approaching object;
when the moving path is determined as falling in the warning area, and the moving path fulfills the confirmation condition, the processing unit sends out a warning signal.

20. The warning system of claim 19, wherein the plurality of detection units comprise a plurality of horizontal radars disposed at opposite corners of the control area in a manner of face to face; a detection range of each horizontal radar is arranged in horizontal orientation, so as to detect the moving path of the approaching object.

21. The warning system of claim 20, wherein the warning area comprises a warning zone and a buffering zone; the warning zone is formed of an expansion of a predetermined width which is detectable by the horizontal radar, and the buffering zone expands with respect to the warning zone.

22. The warning system of claim 21, wherein the confirmation condition is a predetermined count value; when the approaching object enters the buffering zone, a current count value starts to count; if the current count value reaches the predetermined count value, the processing unit determines that the moving path fulfills the confirmation condition in the warning zone; if the current count value does not reach the predetermined count value, the processing unit determines that the moving path does not fulfill the confirmation condition in the warning zone.

23. The warning system of claim 22, wherein the warning zone is a straight line warning zone formed by a straight expansion of the predetermined width expanding toward a same direction, and the buffering zone symmetrically expands toward two sides of the straight line warning zone by an identical distance; when the approaching object enters the buffering zone, the current count value starts to count.

24. The warning system of claim 21, wherein the warning zone is a curve line warning zone formed of a triangle area which is defined by a connection between three points, wherein two of the three points are two distal end points of the predetermined width, and the last one of the three point is a position of the approaching object; when the moving path of the approaching object leaves the curve line warning zone and a moving away condition is fulfilled, the curve line warning zone is redefined by a triangle area formed of a connection between the two distal ends of the predetermined width and a position at where the approaching object is when fulfilling the moving away condition; such operation is repeatedly carried out until the moving path fulfills the confirmation condition and the processing unit accordingly sends the warning signal, or until the approaching object passes the detection unit and leaves away.

25. The warning system of claim 24, wherein the moving away condition is that when the approaching object moves away from the curve line warning zone, a plurality of path points are captured along the moving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

26. The warning system of claim 23, further comprising a curve line warning zone formed of a triangle area which is defined by a connection between three points, wherein two of the three points are two distal end points of the predetermined width, and the last one of the three point is a position of the approaching object; when the moving path of the approaching object leaves the curve line warning zone and a moving away condition is fulfilled, the curve line warning zone is redefined by a triangle area formed of a connection between the two distal ends of the predetermined width and a position at where the approaching object is when fulfilling the moving away condition; such operation is repeatedly carried out until the moving path fulfills the confirmation condition and the processing unit accordingly sends the warning signal, or until the approaching object passes the detection unit and leaves away.

27. The warning system of claim 26, wherein the moving away condition is that when the approaching object moves away from the curve line warning zone, a plurality of path points are captured along the moving path, and the processing unit compares a direction from a first path point to a last path point; when the direction from the first to the last path point faces away from the curve line warning zone, the moving away condition is fulfilled; when the direction from the first to the last path point does not face away from the curve line warning zone, the moving away condition is not fulfilled.

28. The warning system of claim 19, wherein the detection unit detects a relative distance of the approaching object in the detection area to acquire a time to collision; the warning information comprises a predetermined collision time; the processing unit receives the detection signal to acquire the current time to collision of the approaching object; when the moving path falls in the warning zone and fulfills the confirmation condition, and when the time to collision is determined as being equal to or smaller than the predetermined collision time, the processing unit sends out the warning signal.

29. The warning system of claim 20, wherein the plurality of detection units further comprise a plurality of vertical radars disposed on two sides of the road in a manner of face to face; each of the vertical radar has a vertical oriented scanning range, so as to detect the approaching objects which is going to enter the control area.

30. The warning system of claim 29, wherein the plurality of detection units further comprise a plurality of train radars disposed on the rail and arranged on two sides of the intersection of the rail and the road; the train radars are applied for detecting a train which is entering or leaving the control area.

31. The warning system of claim 30, wherein operation frequencies of the horizontal radars and the vertical radars are about 79 GHz, and an operation frequency of the train radars is about 77 GHz.

32. The warning system of claim 20, wherein operation frequencies of the plurality of horizontal radars are different.

* * * * *